United States Patent [19]

Woinsky

[11] 4,279,125

[45] Jul. 21, 1981

[54] PROCESS AND SYSTEM FOR RECOVERY OF ENERGY FROM GEOTHERMAL BRINES AND OTHER HOT WATER CONTAINING SOURCES

[75] Inventor: Samuel G. Woinsky, Irvine, Calif.

[73] Assignee: Occidental Research Corporation, Irvine, Calif.

[21] Appl. No.: 8,793

[22] Filed: Feb. 1, 1979

Related U.S. Application Data

[63] Continuation-in-part of Ser. No. 589,068, Jun. 23, 1975, abandoned, Ser. No. 763,533, Jan. 28, 1977, abandoned, and Ser. No. 836,293, Sep. 26, 1977, Pat. No. 4,213,302.

[51] Int. Cl.$^3$ .......................... F03G 7/00; F01K 23/02
[52] U.S. Cl. ..................................... 60/641F; 60/655; 60/641D
[58] Field of Search ............................... 60/641, 655

[56] References Cited

U.S. PATENT DOCUMENTS

| | | | |
|---|---|---|---|
| 3,988,895 | 11/1976 | Sheinbaum | 60/641 |
| 4,057,964 | 11/1977 | Hutchinson | 60/641 |
| 4,089,175 | 5/1978 | Woinsky | 60/641 |

Primary Examiner—Allen M. Ostrager
Attorney, Agent, or Firm—Max Geldin; Barry A. Bisson

[57] ABSTRACT

Process and system for recovery of energy from geothermal brines and other hot water sources by direct contact heat exchange between the brine or hot water, and a working fluid exiting the top of the heat transfer column is expanded through an expander to produce work. The discharge from the expander is cooled to condense working fluid which is separated in an accumulator from condensed water vapor present in the working fluid, and the condensed working fluid is pressurized and fed back to the heat transfer column. Uncondensible gas together with working fluid losses are vented from the accumulator. In order to decrease the amount of uncondensible vent gas from the accumulator, and the loss of working fluid therein, the hot water or brine feed to the heat transfer column is initially degassed as by flashing, the extent of degassing being controlled based on the concentration of uncondensibles in such hot water or brine feed. The steam and uncondensible gas resulting from flashing is expanded in a work expander to recovery energy. The working fluid can be a compound selected from the group of aromatics, paraffins, napthenes, olefins, and ethers. Where a single component working fluid does not have the desired critical properties for use with a particular brine and well, a preferred working fluid is a mixture of hydrocarbons of the type noted above.

4 Claims, 5 Drawing Figures

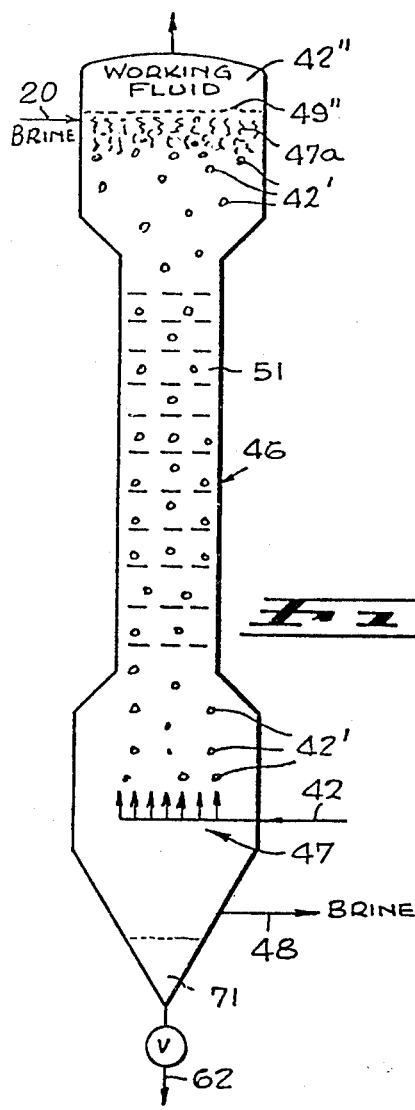
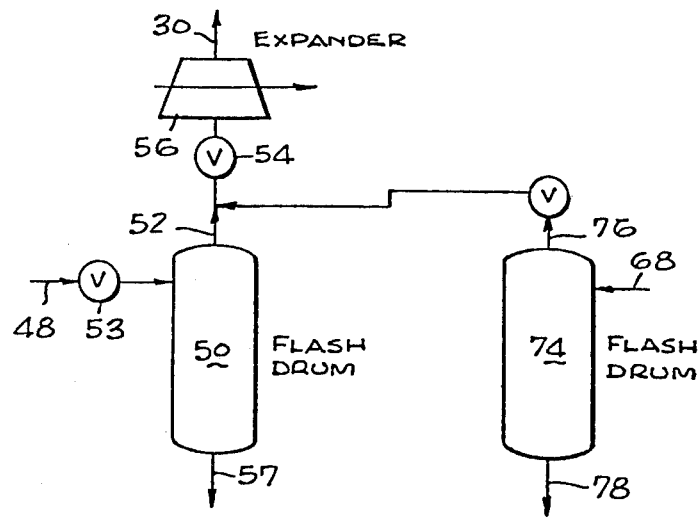
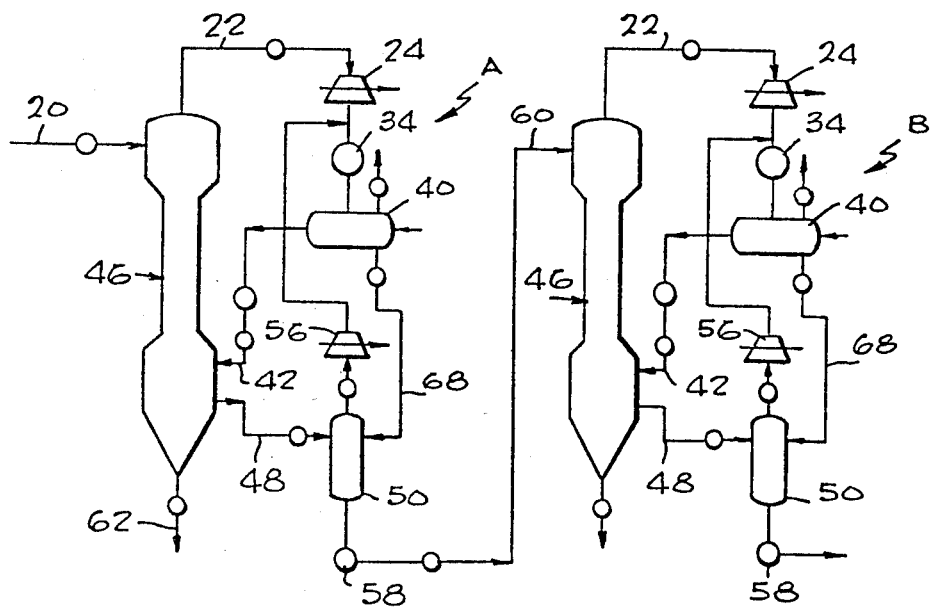

PROCESS AND SYSTEM FOR RECOVERY OF ENERGY FROM GEOTHERMAL BRINES AND OTHER HOT WATER CONTAINING SOURCES

This application is a continuation-in-part of copending applications Ser. No. 589,068, filed June 23, 1975 now abandoned; Ser. No. 763,533, filed Jan. 28, 1977 now abandoned; and Ser. No. 836,293, filed Sept. 26, 1977, now U.S. Pat. No. 4,213,302.

BACKGROUND OF THE INVENTION

This invention relates to the recovery of energy from geothermal brines and other hot water sources, and is particularly concerned with a process and system of the aforementioned type, employing direct contact heat exchange between the hot brine or hot water feed, and a working fluid wherein the heated working fluid is expanded to produce work, and the expanded and discharge working fluid is recycled to the heat transfer column, and further providing for reduction of working fluid losses and the use of mixtures, particularly hydrocarbon mixtures, as working fluid.

U.S. Pat. No. 3,988,895 to Sheinbaum discloses power generation from hot brines by passing a hot fluid in direct contact heat exchange relation with working fluid. The working fluid is vaporized and the vaporized working fluid is passed through a power extracting gas expansion device.

Sheinbaum states that in many cases, fluid from a geothermal well may contain a mixture of steam and water and in this case the fluid is advantageously passed through a flash chamber wherein the steam will be separated from the water and the steam passed through a surface contact heat exchanger for transferring the heat from the steam to the working fluid.

The patentee states that any fixed gases that may be present in the steam may be removed at the output of such heat exchanger by passing the condensate through a separator.

Thus, Sheinbaum is primarily concerned with recovering the heat in the steam contained in the geothermal fluid, and only incidentally vents fixed gases.

Further, the above patent discloses use of isobutane only as working fluid. However, under certain conditions of operation use of only a single hydrocarbon such as isobutane as working fluid does not provide maximum energy recovery from the geothermal brine or other hot water feed.

U.S. Pat. Nos. 3,234,734, and 3,516,248 disclose power generation by heating a working fluid which can be in the form of mixtures of organic fluids, in a boiler and utilizing the energy of the heated vaporized fluid to perform work as by expansion in an expansion engine or turbine. However, the working fluid properties and requirements for the process of these patents are substantially different than for a direct contact heat exchange process of the type disclosed in the above Sheinbaum patent.

It is accordingly a chief object of the invention to provide a process and system for recovery of energy from geothermal brines and hot water sources by operation of a heat transfer column providing direct heat transfer between the hot brine or hot water, and a working fluid, expansion of the heated working fluid and recycling of expanded working fluid to the heat transfer column, while minimizing working fluid losses in the system. A further object is to minimize the amount of uncondensible gas vented from the system, and thereby minimize the loss of working fluid vented with such uncondensible gas. Yet another object is the employment of a working fluid in the form of mixtures of certain organic fluids which under certain conditions of operation increases the efficiency of the above direct contact heat transfer process and system, and results in maximum energy recovery.

BRIEF SUMMARY OF THE INVENTION

The above objects are achieved according to the invention by the provision of a process and system for recovering energy from geothermal brines and other hot water sources such as ground waters heated by solar energy or other means, the energy being recovered from the brine or hot water using a working fluid. The working fluid is heated by the brine or hot water preferably in a direct contact heat transfer column. The heated working fluid is passed through an expander to produce work, which is used to generate electricity or drive equipment. The working fluid from the expander is condensed in a cooler. Condensed working fluid, water and uncondensed gas are separated in an accumulator. The cool liquid working fluid is pumped from the accumulator to the heat transfer column to be heated and carried through the cycle repeatedly.

Cooled brine or water which heated the working fluid in the heat transfer column exits from the bottom of the column which acts as a liquid-liquid separator to minimize entrainment of the working fluid. This cooled brine or water withdrawn from the column is mixed with water separated from the working fluid in the accumulator, and is flashed at a pressure lower than that in the accumulator to flash off entrained and dissolved working fluid in the brine or water from the heat transfer column. The flashed working fluid is then compressed and fed to the cooler at the discharge from the expander, which is used to condense working fluid, and thus is recovered.

One embodiment of the invention process and system resides in operating the heat transfer column at or above the critical pressure of the working fluid, with the hot brine or hot water feed at or above the critical temperature of the working fluid, and converting the working fluid to a dense phase fluid, as defined hereinafter.

An alternative feature or embodiment of the present invention process and system resides in operating the heat transfer column so that the top of the column is in the subcritical pressure region of the working fluid close to or approaching the apex of the saturated vapor curve on the Mollier diagram for such fluid. This procedure provides a working fluid boiling zone at the top of the column. In view of the lower pressure of the resulting vaporized working fluid as compared to operation under critical or supercritical pressure conditions, somewhat less energy is recovered per lb. of working fluid but more lbs. of working fluid are circulated resulting in similar energy recovery per stage but a lower cold brine temperature. Advantages which can accrue from operation under subcritical pressure conditions include simplicity of controls.

Uncondensible gases which are introduced into the system with the feed brine or hot water are vented from the system at the accumulator and carry away some of the expanded working fluid, resulting in working fluid losses. According to a feature of the invention, such working fluid losses are substantially decreased by initially degassing the hot water or brine feed to the heat transfer column under controlled conditions so as to substantially reduce the amount of uncondensibles from the hot feed prior to its introduction into the heat transfer column. This can be accomplished by flashing the feed while controlling pressure conditions in relation to the concentration of uncondensible gas in such feed, so as to remove substantially all or a significant amount of such uncondensible gas with steam from the feed. The steam and uncondensible gas preferably is fed to an expander for the recovery of energy. Such initial degassing as by flashing of the hot water or brine feed to the heat transfer column results in discharge of only a small amount of vent gas from the accumulator, and hence venting little working fluid from the accumulator with such vent gas. This substantially reduces working fluid losses from the system.

Another invention feature is the use of mixtures of working fluids in the heat transfer column under conditions to maximize energy recovery from the hot geothermal brine or other hot water containing feed. This generally is the case where the hot brine or hot water feed is at a relatively low temperature, e.g. of about 200° F. or below. Thus, for example where two or more units of the basic heat transfer column described above are used in order to maximize recovery of energy from the hot brine or hot water feed, and wherein the flashed cooled exit brine or water at reduced temperature from one unit of the system serves as the feed to the heat transfer column of the second unit, in order to adjust the critical properties of the working fluid therein, with respect to the temperature of the hot brine or hot water feed therein, a mixture of working fluids is employed in the second unit. Such mixture of working fluids preferably is a mixture of hydrocarbons, e.g. a mixture of n-propane and n-butane.

The invention process and system including particularly the combination of the above features provides an economical and efficient process for energy recovery from geothermal brines and other hot water sources.

THE DRAWINGS

The above features and advantages of the invention will be more clearly understood by reference to the following detailed description of the invention, taken in connection with the accompanying drawings wherein:

FIG. 2 is a modification of the process and system of FIG. 1, employing two flash drums;

FIG. 4 is a modification of the basic system illustrated in FIG. 1, employing a plurality of the basic units shown in FIG. 1; and FIG. 5 illustrates a Mollier diagram for a typical working fluid, such as n-butane, showing operation under subcritical pressure conditions according to a modification of the invention.

Figure 1:
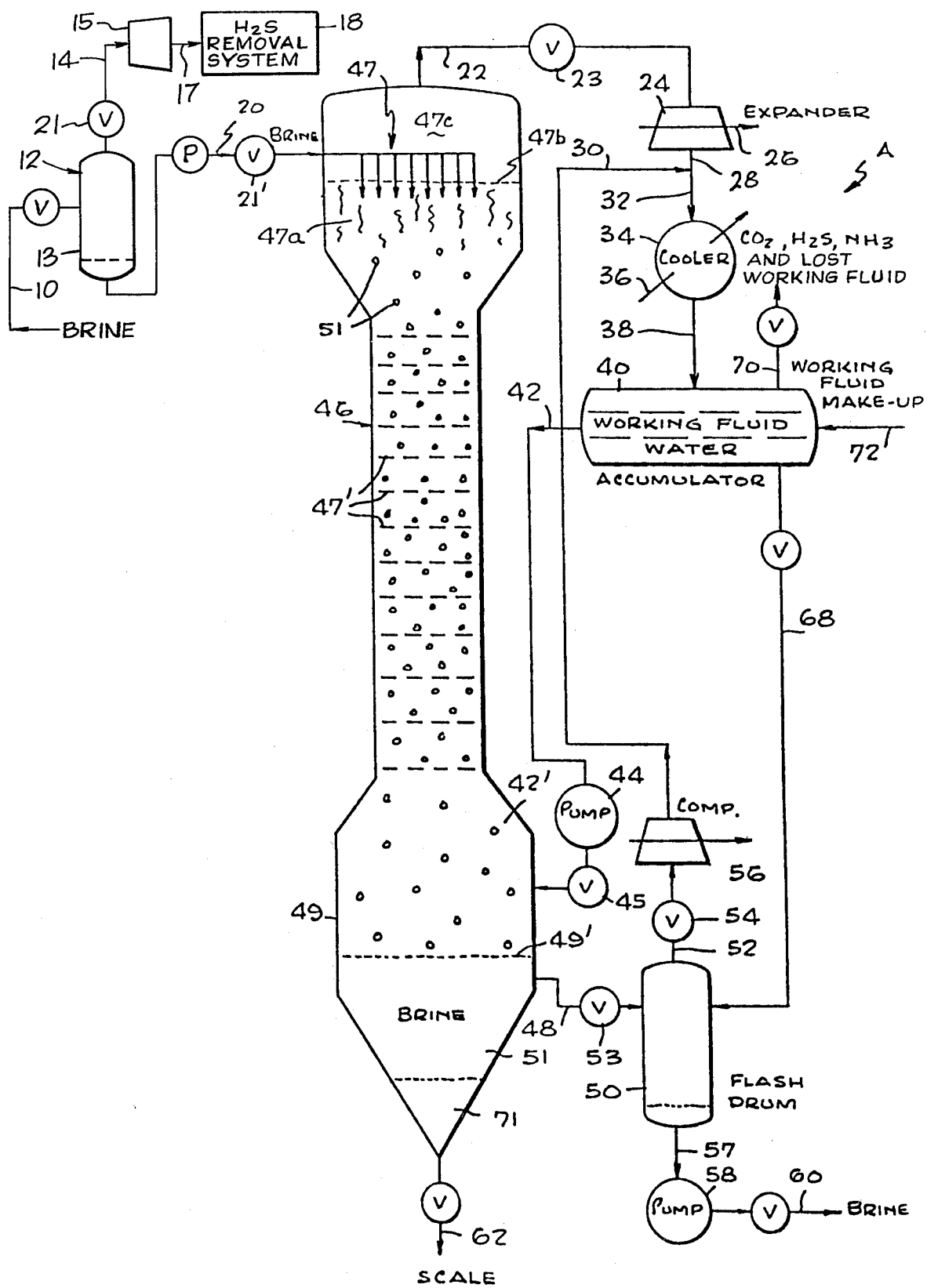
FIG. 1 is a flow chart illustrating a preferred mode of practice of the invention process and system.

Referring to FIG. 1 of the drawing, hot water containing fluid or brine, indicated at 10, from a geothermal production well, is introduced under pressure into degassing unit 12. Degassing unit 12 includes a flash drum 13 in which steam and uncondensible gas, including $CO_2$, $H_2S$ and $NH_3$, present in the brine feed, is flashed off. Such steam and uncondensible gas in line 14 is fed to an expander 15 for recovery of energy, and the expanded mixture of steam and uncondensible gas at 17 is introduced into an $H_2S$ removal system indicated at 19, and described in detail in above copending applications, Ser. Nos. 763,533 and 836,293, and incorporated herein by reference.

The initial removal of uncondensible gas from the brine or hot water containing fluid is essential in order to decrease the amount of uncondensible gas and the accompanying loss of working fluid, vented at 70 from the accumulator 40 in the energy recovery system described in detail hereinafter. In order to remove at least an economically significant or major amount of the uncondensibles in the brine feed, the extent of flashing can be controlled based on the concentration of uncondensibles in the flash drum 13. This is accomplished by means of a pressure control valve 21 in line 14, which is set for pressures, by suitable means, in response to the concentration of uncondensibles in the flash drum 13.

A preferred mode of controlling removal of a significant amount of uncondensibles from the initial hot water or brine feed is to control the extent of flashing based on the loss of working fluid at 70 from the accumulator 40. This can be achieved by setting the pressure control valve 21, e.g. by hand, based on holding the amount of working fluid make-up at 72 at an acceptable level. Increases in working fluid make-up at 72 are caused by working fluid losses at 70, due to the presence of remaining uncondensibles in the brine or hot water containing fluid discharged from flash drum 13.

In the above flashing procedure for removing uncondensible gas from the hot water containing fluid or brine feed prior to its introduction into the energy recovery system, for decreasing working fluid losses from the system, some steam is flashed off from the incoming hot water containing fluid or geothermal brine, regardless of the amount of steam present in the hot water containing fluid or geothermal brine at the outlet of the well. Thus, the recovery of energy from the flashed steam as by work expansion thereof at 15, although advantageous to enhance overall energy recovery from the system, is only incidental to the above noted main purpose of uncondensible gas removal from the incoming hot feed. This is in contrast to the process and system of the above Sheinbaum patent, wherein flashing of the geothermal brine is initially carried out for recovery of steam, which is used for transferring heat to the working fluid. Sheinbaum was only incidentally concerned with the initial removal of uncondensible gas in the hot geothermal brine. Thus, Sheinbaum failed to recognize the effect of uncondensibles in the system on working fluid losses therein and was primarily concerned with removing any steam which naturally occurred in the geothermal fluid at the well outlet, for recovering its heat energy.

The degassed hot water or brine then passes through conduit means 16 to pump 18 which discharges through the conduit means 20 via valve 21' into the top of a heat transfer column 46 in direct contact heat exchange with a working fluid. Such working fluid can be any suitable material which does not undergo a density inversion. For example, a density inversion would correspond to a situation where the density of the working fluid at the cold end of the column is greater than the density of the brine or water at that end of the column, and at the hot end of the column the density of the working fluid is less than the density of the brine or water at that end of the column, thereby preventing countercurrent flow of working fluid and water containing fluid such as brine.

According to the above alternative embodiment of operation at subcritical pressure, such working fluid can be any suitable material, and characterized by a saturated vapor or saturation curve on a Mollier diagram for such fluid, having an apex at a temperature lower than the incoming hot water source temperature and at a pressure high enough to obtain good energy recovery in the expander. Also, the working fluid should have a density less than that of the water containing, e.g. brine, phase.

Thus, the working fluid can include aromatics, paraffins, naphthenes, olefins and ethers. Preferably, the working fluid is a paraffin or olefinic hydrocarbon containing from about 1 to about 8 carbon atoms, either straight or branched chain such as methane, ethane, propane, n-butane, isobutane, n-pentane, isopentane, neopentane (2,2-dimethylpropane), n-hexane, cyclohexane, n-heptane, n-octane, isooctane, and the analogous olefins such as n-butene, isobutene, and the like. Most desirably, paraffinic or olefinic hydrocarbons containing from about 2 to about 5 carbon atoms are employed. Aromatic hydrocarbons such as benzene, toluene and xylene also can be used.

A single component fluid of the above types can be used. However, particularly under certain conditions of operation, e.g. where the hot water or hot brine feed is at relatively low temperature, e.g. about 200° F. or below, a mixture of the above organic compounds or organic fluids selected from the group consisting of the above aromatics, paraffins, naphthenes, olefins and ethers is employed, and particularly mixtures of hydrocarbons selected from the group consisting of aromatics, paraffins, naphthenes and olefins. Thus, for example, a mixture of the above noted paraffins and olefins can be used, or mixtures of a single one of the above groups, such as a mixture of paraffins, or a mixture of olefins, can be utilized, e.g. a mixture of methane and ethane, ethane and n-propane, or n-propane and n-butane, in order to optimize the critical temperature and pressure conditions of the working fluid, and thereby obtain maximum energy recovery from the geothermal brine or hot water feed. Mixtures of ethers, e.g. mixtures of dimethyl, diethyl and methyl ethyl ether, or mixtures of hydrocarbons and ethers can be employed, e.g. a mixture of methyl ethyl ether and isobutane. With respect to the above alternative embodiment of operation at subcritical pressure, other substances or mixtures are also suitable as long as the position of the apex of their respective saturation curves on a Mollier diagram is appropriate, as noted above, relative to the temperature of the hot water containing feed, and such substances or mixtures are less dense than the water containing phase.

The hot water or brine can be fed to the column at or above the critical temperature of the particular working fluid employed in the column. Inlet temperature of the hot water or brine to the top of the column ranges from about 60° to about 600° F., usually about 100° to about 600° F., with the range of about 150° to about 400° F. being preferred. In this embodiment the heat transfer column 46 is operated at or above the critical pressure of the working fluid in the top of the column, such pressure preferably ranging from about 450 psia to about 1,000 psia. With respect to the above alternative embodiment of operation at subcritical pressure, the heat transfer column 46 is operated so that the top of the column is below the critical pressure of the working fluid in the top of the column, such pressure preferably ranging from about 200 psia to about 700 psia. The working fluid is heated in the heat exchange column 46 by direct contact with the incoming hot brine or hot water. For this purpose a distributor 47 is provided at the top of the column, which can be in the form of a manifold having a plurality of spray nozzles (not shown) for spraying the hot brine or hot water at 51 downwardly into the column. However, other types of distributors can be employed such as a multiple "V" notched weir type, the distributor functioning to obtain sufficiently small drop sizes of hot liquid brine or water to provide good heat transfer rates.

The heat transfer column 46 can be of any conventional type such as disk-and-doughnut which would prevent back mixing and provide a large open area for any scale problems. The upper region of the column where the working fluid is more like a gas than a liquid can employ angle iron trays (not shown) similar to those used in ethylene plant wash towers. Perforated plate dual flow trays as indicated schematically at 47' can be used with a high agitation, keeping any scale suspended.

The lower portion 49 of the heat transfer column functions as a liquid-liquid separator and can be a simple gravity separator or parallel plates (not shown) can be provided to improve separation and minimize entrainment of working fluid. However, any entrained working fluid can be recovered in the working fluid recovery section shown in FIG. 1 and described in greater detail below.

In the system described above, and illustrated in FIG. 1, the working fluid 42' passing upwardly in the column countercurrent to the flow of feed brine or water, is the continuous phase, and the brine or water distributed into the top of the column is the discontinuous phase, the interface 49' between the working fluid and the brine or water phases being at the bottom of the column.

As previously noted, the heat exchange column 46 is operated according to one embodiment so that the working fluid in the top zone of the column will be at or above the working fluid's critical temperature, and the partial pressure of the working fluid in the working fluid stream at the top zone will be at or above the working fluid's critical pressure. This mode of operation removes the high localized heat load due to the heat of vaporization which is experienced at subcritical conditions. Thus, such operation causes the working fluid to be converted from a liquid to a dense phase fluid at or above the critical temperature of the fluid and at a partial pressure equal to or greater than its critical pressure. The term "dense phase fluid" means any fluid at or above its critical temperature. Therefore, there is no heat of vaporization and no large $\Delta t$ at the vaporization point. Consequently, the heat transfer column can heat balance with close $\Delta t$'s between inlet brine or water and working fluid.

The heated dense phase working fluid in the top of the column is passed through conduit 22, via valve 23, to a work expander 24, where it expands to produce work which is transmitted through shaft 26. The expander outlet pressure can range from about 1 to about 600 psia, but is preferably in the range of about 30 to about 250 psia.

As previously noted, according to the above alternative embodiment of operation at subcritical pressure, the heat exchange column 46 is operated so that the working fluid in the top zone of the column will be below the working fluid's critical pressure. Therefore, in this embodiment there is a boiling zone at the top of the column, indicated at 47a, above the continuous working fluid phase 42', and an interface 47b between the liquid phases and the vapor space 47c at the top of the column. The heated and vaporized working fluid in the boiling zone 47a at the top of the column passes into the vapor space 47c and is passed through conduit 22, via valve 23, to the work expander 24. As noted below, during expansion the expanded fluid most desirably is in the single phase form, and not more than about 10% by weight of the fluid being in its liquid phase.

With respect again to the alternative embodiment of operation at subcritical pressure, and referring now to FIG. 5 illustrating a Mollier diagram showing enthalpy per lb. of working fluid plotted against entropy per lb. of working fluid, curve A illustrates the saturated vapor curve for a particular working fluid such as n-butane. It will be noted that the upper portion A' of curve A hooks around to the left, and the upper end of curve A just as it hooks to the left and at the highest enthalpy on the curve is designated herein the apex of curve A, as represented by point B. It will be noted from FIG. 5 that practically all of the saturated vapor curve A, including the hooked portion A' thereof is below the critical pressure line for the particular working fluid, designated C, the extreme left end of such critical pressure line C touching the hooked portion A' of the vapor pressure curve A, at a point near its extremity and designated D. It will accordingly be noted that operation along substantially the entire saturated vapor line A, including the hooked portion A', such as at point E below the apex B, involves operation below the critical pressure C for the fluid, and hence involves a boiling of the working fluid in the upper portion of the heat transfer column 46.

The apex, point B, on the saturated vapor curve A is defined herein as the point on the saturated vapor curve A below the critical pressure for such fluid, and corresponding to an enthalpy and a pressure which will maximize the amount of energy of work obtained from the expander per lb. of working fluid. Hence, operation of the process according to the present invention is made to take place along saturated vapor curve A at a point on such curve which is near, that is close to or approaching, the apex B on the saturated vapor curve, and corresponding to a pressure so as to maximize the amount of work obtained from the expander, while at the same time not more than about 10% of the expanded fluid becomes liquid during expansion. Such operation close to or approaching the apex B on the saturated vapor curve can take place along the saturation curve A below the apex B or beyond apex B along the hooked portion A' of the saturated vapor curve A. Thus, for example operation can take place at a point E on the saturated vapor curve A close to or approaching the apex B, and which is at a sufficiently high subcritical pressure as indicated by the pressure line F, which will provide as close to a maximum amount of work as possible during expansion, as indicated by the vertical line G extending from point E and at a temperature indicated by the temperature line F', down to a pressure indicated by point H on the lower pressure line J.

Although the amount of work thus obtained from the expander as indicated by the vertical line G showing the change in enthalpy during expansion, is less than the amount of work as indicated by line L, which would be obtained by operating, that is expanding the working fluid from a pressure at the critical pressure or above, as described in my above copending application, more pounds of working fluid are circulated when operating under subcritical conditions as indicated by line G according to the invention, than at critical or supercritical conditions as indicated by line L.

It is noted that operation can be carried out according to this embodiment under subcritical conditions along the hooked portion A' of the saturated vapor curve A such as at point K and which is adjacent to or approaches the apex B. On the other hand if operation is carried out along the saturated vapor curve A at a point substantially distant from the apex B, such as at a point M, a disadvantage accrues, namely the amount of work indicated by the change in enthalpy line M' thus obtained is substantially reduced. If operation is carried out along the hooked portion A' of the saturated vapor curve A, at a point substantially distant from the apex B, such as at point N, although the amount of work or energy thus obtained, as indicated by change in enthalpy line O is increased, a disadvantage accrues, namely, the formation of a substantial amount of liquid, that is substantially more than 10% liquid, will result during expansion, which is undesirable in that it can cause damage to the equipment.

Hence, it is preferred to operate according to this embodiment under subcritical pressure conditions along the saturated vapor curve A or the hooked portion A' thereof, at a point as close to the apex B as possible without having more than 10% condensation formed in the expander, that is, wherein not more than about 10% by weight of the vapors expanded is converted to the liquid phase. Preferably, the operation is carried out with a working fluid enthalpy at the expander inlet which is 0 to about 10%, most desirably 0 to about 5%, less than the enthalpy at the apex, on a water free basis. It will be understood that a small amount of water is usually present in the overhead working fluid. Thus, for example, the enthalpy at the apex of the saturated vapor curve for n-butane is about 363 BTU/lb. Accordingly, enthalpy at the expander inlet for this working fluid should be at a point on its saturated vapor curve corresponding to an enthalpy of not less than about 327 BTU/lb. and preferably not less than about 345 BTU/lb. Operation can take place at the apex B itself, provided that less than 10% condensation occurs on expansion. Hence the terms "near", "close to" and "approaching" the apex of the saturated vapor curve as employed herein also are intended to include operation at the apex, under the conditions noted above.

Referring again to FIG. 1, the expander working fluid, following expansion, is then passed via conduit 28, wherein it is mixed with recovered working fluid from line 30, and the resulting mixture passes via line 32 into a cooler 34, using cool water or air fed through line 36 as cooling medium to condense working fluid. Condensation temperature in the cooler preferably is in the range of about 30° F. to about 140° F. The condensed working fluid is then fed through conduit 38 to an accumulator 40.

Water vapor present in the working fluid in line 22 condenses in expander 24 and cooler 34, and is separated from condensed working fluid in accumulator 40, along with any uncondensibles not removed in the degasser 12.

The condensed working fluid in accumulator 40 is removed through line 42 and through pump 44 to pressurize the working fluid approximately to the pressure in heat transfer column 46 and the pressurized fluid is then fed via valve 45 to the bottom portion 49 of the heat transfer column 46, to be reheated. Cooled brine or water at 51 in the bottom of the heat transfer column is fed via line 48 and valve 53 therein to a flash drum 50, which is at a lower pressure than that in the accumulator. Water from accumulator 40 is fed through line 68 to flash drum 50.

The working fluid flashed off in drum 50 from the cooled brine or water at 48 and the water from the accumulator, is fed through line 52 and via valve 54 to a compressor 56. The working fluid is compressed to a pressure corresponding to the above noted pressure at the work expander outlet, and preferably ranging from about 30 psia to about 250 psia. The compressed working fluid is then returned for cooling and recovery through line 30, for admixture with the working fluid expander discharge in line 28.

Any uncondensible gases plus working fluid losses are vented from the system and the accumulator 40, through line 70. As previously noted, such uncondensible vent gas and working fluid loss from the accumulator is kept to a minimum by the initial degassing operation previously described. Make-up working fluid can be introduced into the accumulator at 72. Cooled brine or water is discharged at 57 from the flash drum 50 through pump 58 and line 60. Any scale formed in the heat exchanger column 46 is separated at 71 in the bottom of the heat transfer column and discharged through line 62.

Use of the flash drum 50 which can be held at a lower pressure than the accumulator 40, separates flashed vapors of working fluid which are then compressed in compressor 56 so that working fluid can be recovered by cooling and condensation. Reduction of pressure in the flash drum below the saturation pressure of working fluid at the bottom of column 46 will cause entrained working fluid in line 48 to vaporize in the drum 50. Also, dissolved working fluid in both the cooled brine or water at 48 and in the water at 68 from the accumulator, will partially vaporize in the flash drum. The extent of dissolved working fluid vaporization is relatively high due to the nonideal nature of the solution.

In a preferred mode of operation of the system of FIG. 1, the working fluid recovery flash drum 50 is operated at a pressure in the range of about 15 psia to about 250 psia, the corresponding flash drum temperature being in the range of about 80° F. to about 200° F.

In conjunction with such increased pressure in the flash drum 50, the accumulator 40 is operated at a lower pressure essentially at the saturation pressure of the working fluid corresponding to the working fluid temperature in the accumulator, and which is a function of the available cooling water temperature. The pressure in the accumulator, for this purpose, can range from about 1 psia to about 600 psia, and the temperature from about 80° F. to about 150° F.

If desired, one or more liquid expanders (not shown) can be provided in the exit brine line 48 in FIG. 1 from the bottom of the heat transfer column to recover additional energy.

If desired, referring to FIG. 2, condensed water in line 68 withdrawn from the accumulator, alternatively can be introduced into a separate flash drum 74, similar to 50, with the flashed working fluid exiting therefrom at 76 being mixed with the flashed working fluid at 52 withdrawn from the flash drum 50, and the mixed working fluid passed to the intake of the compressor 56. This modification permits removal of water at 78 from the separator 74, of a purity sufficient for use as a drinking water.

Figure 3:
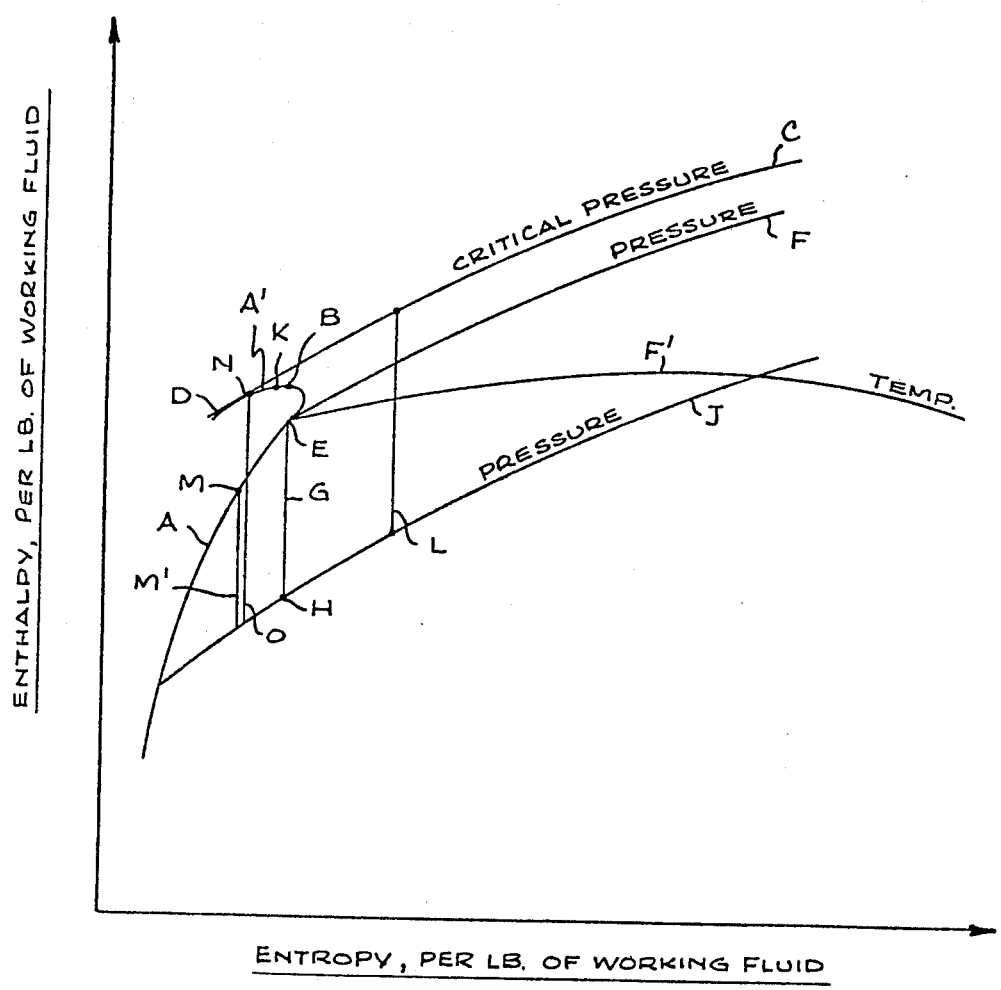
FIG. 3 illustrates a modification of the process and system of FIG. 1, wherein the brine or water feed to the heat transfer column is the continuous phase.

In the process and system illustrated in FIG. 1, the working fluid is the continuous phase. However, in the embodiment illustrated in FIG. 3, the distributor 47 can be positioned in the bottom of the heat transfer column and the pressurized working fluid in line 42 passed into the distributor and sprayed upwardly in the column in countercurrent direct heat exchange relation with the brine or water entering at the top of the column. In this embodiment the water containing or brine phase 51 is the continuous phase, the working fluid is the discontinuous phase, and the interface 49'' between the brine or water and the working fluid phase is at the top of the column. Where the top of the column is maintained at a pressure below the critical pressure of the working fluid, the interface 49'' between the brine or water 51 and the working fluid phase 42'' is at the top of the column, but is now a vapor-liquid interface. Droplets of working fluid 42' vaporize in the boiling zone 47a at the top of the column, and come off as a gas at 42''.

In order to avoid temperature pinch in the column, that is a substantial reduction of the temperature differential between the hot brine or water and the working fluid along the length of the column, thereby substantially reducing heat transfer from the hot brine or water to the working fluid, the rate of circulation of the working fluid in the column must be decreased. However, as the flow rate of the working fluid is decreased this increases the temperature of the cooled brine or water in the bottom of the column, leaving substantial heat energy remaining in the cooled brine or water exiting the bottom of the column. Thus, where the hot brine or hot water feed is, for example, 322° F., the exiting cooled brine or water at 48 can be at a relatively high temperature of about 155° F. to about 180° F.

In order to recover the remaining energy from the water or brine leaving the system at 48 and 60 in FIG. 1, and referring to FIG. 4, such exiting brine or water is fed into the heat transfer column 46 of a second unit B essentially identical to the energy recovery unit A illustrated in FIG. 1, and including elements 46, 24, 34, 40, 50 and 56, unit B being in series with Unit A, and the operating cycle described above is repeated in unit B. In the unit B, however, a different working fluid, preferably a mixture of hydrocarbons, e.g. a mixture of ethane and propane, is generally used to adjust the critical temperature conditions of such working fluid in relation to the temperature of the incoming brine or water feed at 60, or in the case of the operation of the column in the subcritical pressure region of the working fluid, to permit adjustment of the location of the apex of the saturation curve of such working fluid in relation to the temperature of the incoming brine or water feed at 60. The result is the recovery of additional energy in unit B from each unit of weight of brine or water exiting unit A.

When a single unit such as A in FIG. 4, corresponding to FIG. 1 is used, and the hot water or hot brine feed is below about 200° F., maximum energy recovery is also obtained using a mixture of fluids such as a mixture of ethane and propane, or a mixture of n-propane and n-butane.

The following are examples of practice of the invention process and system.

EXAMPLE 1

A hot brine from a geothermal well at a temperature of 330° F. is flashed, the pressure of the flash drum being controlled in relation to the concentration of uncondensible gas in the hot brine, so that substantially all or most of the uncondensible gas, together with steam, is removed from the hot brine, and such mixture of steam and uncondensible gas is fed to a work expander for recovery of energy. The degassed hot brine is then pumped into the top of a heat transfer column operated at an internal pressure of about 560 psia. In the heat transfer column the brine is passed into direct contact heat exchange relation with isobutane introduced into the lower portion of the column.

The isobutane working fluid heated by the hot brine feed in the heat transfer column, is converted to a dense phase fluid and exits the heat transfer column at a temperature of 300° F. and is expanded through an expander to produce work. The expanded working fluid discharged from the expander is at a temperature of 159° F. and at a pressure of 75 psia.

The isobutane working fluid is cooled and condensed in a cooler to an outlet temperature of about 100° F. and a pressure of 73.5 psia. The isobutane working fluid-water condensate thus formed is introduced into an accumulator and is separated therein from uncondensible gases and condensed water. The condensed isobutane from the accumulator is then pumped at about 560 psia back into the bottom of the heat transfer column to be reheated by the hot brine feed.

Cooked brine from the bottom of the heat transfer column at a temperature of about 157° F. is introduced into a work expander and the expanded discharged brine is fed to a flash drum operated at a pressure of 33 psia. The isobutane working fluid flashed off from the top of the flash drum and at a temperature of about 157° F. is compressed to a pressure of about 75 psia and is mixed with isobutane working fluid discharged from the first mentioned expander, and the resulting mixture is returned to the cooler for condensation and recovery of working fluid in the accumulator.

Brine at about 157° F. and containing a small amount of isobutane and dissolved uncondensible gas, is removed from the flash drum and pumped at about 1,500 psig to a brine injection well.

Only a small amount of vent gas containing uncondensibles and a small amount of lost isobutane working fluid is discharged from the accumulator.

Make-up isobutane working fluid is introduced at a pressure of 73.5 psia into the accumulator to compensate for lost working fluid.

Calculated on a basis of the use of 0.83 lb. isobutane working fluid to 1 lb. of hot brine feed, 17.7 Btu of net work is obtained from the system, considering all equipment including expanders and the pumps operating at 80% efficiency. The rate of loss of isobutane from the system is about 0.006% of the total isobutane working fluid circulation rate through the system.

EXAMPLE 2

A hot brine from a geothermal well at a temperature of 330° F. is flashed, the pressure of the flash drum being controlled in relation to the concentration of uncondensible gas in the hot brine, so that substantially all or most of the uncondensible gas, together with steam, is removed from the hot brine, and such mixture of steam and uncondensible gas is fed to a work expander for recovery of energy. The degassed hot brine is then pumped into the top of a heat transfer column operated at an internal pressure of about 414 psia. In the heat transfer column the brine is passed into direct contact heat exchange relation with isobutane introduced into the lower portion of the column.

The isobutane working fluid heated by the hot brine feed in the heat transfer column, is converted to a boiling fluid which exits the heat transfer column at a temperature of 246° F. and is expanded through an expander to produce work. The expanded working fluid discharged from the expander is at a temperature of 138° F. and a pressure of 75 psia.

The isobutane working fluid is cooled and condensed in a cooler to an outlet temperature of about 100° F. and a pressure of 73.5 psia. The isobutane working fluid-water condensate thus formed is introduced into an accumulator and is separated therein from uncondensible gases and condensed water. The condensed isobutane from the accumulator is then pumped at about 414 psia back into the bottom of the heat transfer column to be reheated by the hot brine feed.

Cooled brine from the bottom of the heat transfer column at a temperature of about 138° F. is introduced into a work expander and the expanded discharged brine is fed to a flash drum operated at a pressure of 33 psia. The isobutane working fluid flashed off from the top of the flash drum and at a temperature of about 138° F. is compressed to a pressure of about 75 psia and is mixed with isobutane working fluid discharged from the first mentioned expander, and the resulting mixture is returned to the cooler for condensation and recovery of working fluid in the accumulator.

Brine at about 138° F. and containing a small amount of isobutane and dissolved uncondensible gas, is removed from the flash drum and pumped at about 1,500 psig to a brine injection well.

Only a small amount of vent gas containing uncondensibles and a small amount of lost isobutane working fluid is discharged from the accumulator.

Make-up isobutane working fluid is introduced at a pressure of 73.5 psia into the accumulator to compensate for lost working fluid.

Calculated on a basis of the use of 1 lb. isobutane working fluid to 1 lb. of hot brine feed, 17.0 BTU of net work is obtained from the system, considering all equipment including expanders and the pumps operating at 80% efficiency. The rate of loss of isobutane from the system is about 0.005% of the total isobutane working fluid circulation rate through the system.

EXAMPLE 3

Instead of pumping the brine removed from the flash drum to a brine injection well in Example 1, such brine at 157° F. is fed into the heat transfer column of a second unit, similar to that shown at B in FIG. 4 and operated at an internal pressure of about 662 psia. The working fluid employed in such unit is a mixture of about 46 mol % ethane and about 54 mol % propane.

As essentially described above in Example 1, the working fluid mixture is heated in the heat transfer column and then expanded in a work expander to recover additional energy, the expanded working fluid cooled, condensed and introduced into an accumulator and separated therein from condensed water. The condensed working fluid is then pumped back to the heat transfer column. Cooled brine is removed from the bottom of the heat transfer column of the second unit and flashed to recover additional working fluid. There is only a small amount of vent gas containing uncondensibles and lost working fluid from the accumulator.

Energy can also be recovered according to the invention from the water sources at lower temperatures than geothermal brines. Thus, for example ocean brines, which are solar heated, and often at temperatures substantially lower than 100° F., e.g. down to about 60° F., can be used as feed in the invention process and system. Such brines are also understood to be encompassed within the term "hot water sources" employed herein, as contrasted to sea water brines of substantially lower temperature, for example deep sea water at about 35° F. Where ocean brine at a temperature of about 60° F. is employed as feed to the invention process and system, the working fluid is preferably in the form of a mixture of ethane and a small amount of methane.

From the foregoing, it is seen that the invention affords a novel and efficient process and system for recovery of energy from geothermal brines and other hot water sources, employing direct contact heat exchange between the hot geothermal brine or water-containing fluid, e.g. hot water, and a working fluid, preferably a hydrocarbon or hydrocarbon mixtures, for extraction of energy from the heated working fluid in an expander, and incorporating procedure and means for efficient recovery of working fluid and recycling thereof for heat transfer with the geothermal brine or other hot water feed, and employing degassification of the hot water containing fluid such as hot geothermal brine priorto introduction of the hot feed into the heat transfer column, to remove uncondensible gas, and thereby reduce working fluid losses in the system.

While I have described particular embodiments of my invention for purposes of illustration, it will be understood that various changes and modifications within the spirit of the invention can be made, and the invention is not to be taken as limited except by the scope of the appended claims.

What is claimed is:

1. Process for recovery of energy from hot water-containing fluids containing uncondensible gas, said hot water-containing fluids including geothermal brines and other hot water sources, which comprises
    (a) flashing said hot water-containing fluid to flash off a mixture of steam and uncondensible gas and substantially reduce the amount of uncondensible gas in said hot water-containing fluid,
    (b) work expanding said mixture to recover energy,
    (c) introducing said flashed hot water-containing fluid into a first heat transfer zone and directly contacting said flashed hot water-containing fluid therein, with a first working fluid in liquid form, to provide a first heated working fluid comprising water vapor and uncondensible gas, and a cooled water-containing fluid,
    (d) expanding said first heated working fluid in an expander to produce work,
    (e) discharging said expanded first working fluid from said expander,
    (f) cooling said discharged first working fluid, to provide a condensed working fluid comprising condensed water vapor and uncondensible gas,
    (g) separating in an accumulator zone said condensed first working fluid from said condensed water vapor and uncondensible gas,
    (h) returning said separated first working fluid under pressure to said heat transfer zone for reheating therein,
    (i) venting said uncondensible gas from said accumulator zone,
    (j) withdrawing said cooled water-containing fluid at a moderately elevated temperature from said heat transfer zone,
    (k) introducing said withdrawn water-containing fluid into a second heat transfer zone and directly contacting said withdrawn water-containing fluid therein, with a second working fluid in liquid form, to provide a second heated working fluid, comprising water vapor and an uncondensible gas,
    (l) withdrawing said second heated working fluid from said second heat transfer zone,
    (m) expanding said withdrawn second working fluid to produce work,
    (n) cooling said expanded second working fluid, to produce a condensed second working fluid comprising condensed water vapor and uncondensible gas,
    (o) separating said condensed second working fluid from condensed water and any uncondensible gas, and
    (p) returning said separated second working fluid under pressure to said second heat transfer zone, said flashing of said hot water-containing fluid being controlled to substantially reduce the concentration of uncondensible gas in the hot water-containing fluid prior to its introduction into said first heat transfer zone and thereby decreasing the amount of working fluid vented from the accumulator, along with said vented gas, and wherein said first working fluid comprises a single organic fluid selected from the group consisting of aromatics, paraffins, naphthenes, olefins and ethers, and said second working fluid comprises a mixture of said organic fluids.

2. The process as defined in claim 1, wherein said first working fluid comprises a single paraffin or olefin hydrocarbon containing from about 1 to about 8 carbon atoms, and said second working fluid comprises a mixture of said hydrocarbons.

3. The process as defined in claim 1, wherein said first working fluid comprises a single paraffin containing from about 2 to about 5 carbon atoms, and said second working fluid comprises a mixture of said hydrocarbons.

4. A system for recovering energy from hot water-containing fluids containing uncondensible gas, said hot water-containing fluids including geothermal brines and other hot water sources, said system comprising:
    (a) flash means for flashing said hot water-containing fluid to separate therefrom a mixture of steam and uncondensible gas and to substantially reduce the amount of uncondensible gas in said hot water-containing fluid;
    (b) first expander means interconnected with said flash means, for work expanding the mixture of steam and uncondensible gas to recover energy,
    (c) a heat transfer column interconnected with said flash means and including means, for directly contacting the flashed hot water-containing fluid with a working fluid to provide a hot working fluid containing water vapor and uncondensible gas and a cooled water-containing fluid;
    (d) second expander means interconnected with said heat transfer column for expanding said hot working fluid containing water vapor and uncondensible gas to recover energy and for discharging expanded working fluid;

(e) cooling means interconnected with said second expander means for cooling said expanded working fluid to produce a condensed working fluid containing condensed water vapor and uncondensible gas;
(f) accumulator means interconnected with said cooling means, for separating said condensed water vapor and uncondensible gas from said condensed working fluid;
(g) means for returning said condensed working fluid from said accumulator means to said heat transfer column;
(h) means for venting said uncondensible gas from said accumulator means; and,
(i) means responsive to the concentration of uncondensible gas in said hot water-containing fluid, for varying the pressure of the flashing of hot water-containing fluid to substantially reduce the concentration of uncondensible gas in the hot water-containing fluid prior to introduction into said heat transfer column in order to decrease the amount of working fluid vented from the accumulator means with uncondensible gas.

* * * * *